(12) United States Patent
McCarthy et al.

(10) Patent No.: US 8,781,300 B2
(45) Date of Patent: Jul. 15, 2014

(54) SYSTEM AND APPARATUS FOR MANAGING VIDEO CONTENT RECORDINGS

(75) Inventors: Mary McCarthy, Frisco, TX (US); Robert Coldwell, Sachse, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1308 days.

(21) Appl. No.: 12/126,627

(22) Filed: May 23, 2008

(65) Prior Publication Data

US 2009/0290856 A1 Nov. 26, 2009

(51) Int. Cl.
H04N 7/26 (2006.01)
H04N 21/40 (2011.01)
H04N 21/45 (2011.01)

(52) U.S. Cl.
CPC ............ *H04N 7/26* (2013.01); *H04N 7/26021* (2013.01); *H04N 21/40* (2013.01); *H04N 21/4516* (2013.01)
USPC ............................ 386/248; 386/294; 386/299

(58) Field of Classification Search
CPC .............. H04N 21/40; H04N 21/4516; H04N 7/26021; H04N 7/26
USPC .................................................. 386/294, 299
See application file for complete search history.

(56) References Cited

U.S. PATENT DOCUMENTS

| 7,298,960 | B1 * | 11/2007 | Taylor et al. | 386/291 |
|---|---|---|---|---|
| 2002/0054750 | A1 * | 5/2002 | Ficco et al. | 386/46 |
| 2005/0160308 | A1 * | 7/2005 | Elcock et al. | 714/5 |
| 2007/0168539 | A1 * | 7/2007 | Day | 709/231 |
| 2007/0276907 | A1 * | 11/2007 | Maes | 709/204 |
| 2008/0013919 | A1 * | 1/2008 | Boston et al. | 386/83 |
| 2008/0092177 | A1 | 4/2008 | Swanburg et al. | |
| 2008/0274768 | A1 * | 11/2008 | Toriumi et al. | 455/556.1 |
| 2009/0158373 | A1 * | 6/2009 | Belz et al. | 725/114 |
| 2009/0220216 | A1 * | 9/2009 | Marsh et al. | 386/124 |
| 2009/0307307 | A1 * | 12/2009 | Igarashi | 709/203 |

FOREIGN PATENT DOCUMENTS

EP 1850591 10/2007

OTHER PUBLICATIONS www.Youtube.com, "Netflix Party on XBox Live", 3-page article, http://www.youtube.com/watch?v=_FuPxEC8Tfc&feature= related, web site last visited Jan. 20, 2010.
www.Youtube.com, "NXE Dashboard, Aug. 11th Update Preview Program—Netflix Party", 2-page article, http://www.youtube.com/watch?v=2brb-gCt2ss, web site last visited Jan. 20, 2010.

(Continued)

*Primary Examiner* — Brandon Hoffman
*Assistant Examiner* — Michael D Anderson
(74) *Attorney, Agent, or Firm* — Guntin & Gust, PLC; Andrew Gust

(57) ABSTRACT

A system that incorporates teachings of the present disclosure may include, for example, a digital video recorder (DVR) having a controller to record video content supplied by a media communication system, establish a threshold for utilization of a memory resource of the DVR, detect a utilization of the memory resource that exceeds the threshold, generate a notice describing the utilization of the memory resource at or after the time the threshold was exceeded, identify a communication identifier associated with a portable communication device, transmit the notice to the portable communication device according to the identified communication identifier, and receive a response message from the portable communication device that includes one or more instructions to manage the memory resource of the DVR. Other embodiments are disclosed.

20 Claims, 7 Drawing Sheets

(56) References Cited

OTHER PUBLICATIONS

Georgia Tech., "Avatar Theater—Experimental TV Lab at Georgia Lab", 2-page article, http://etv.gatech.edu/projects/avatar-theater/, web site last visited Jan. 20, 2010.

Konstantinos Chorianopoulos, "Content-Enriched Communication—Supporting the Social Uses of TV", 10-page article, The Journal of the Communications Network, vol. 6, Part 1, Jan.-Mar. 2007.

Khadraoui et al., "Interactive TV Show Based on Avatars", IEEE: Systems Communications, 2005, Proceedings, Aug. 17, 2005, pp. 192-197.

Luyten et al., "Telebuddies: Social Stitching with Interactive Television" Hasselt University—Transnationale Universiteit Limburg, Belgium, 6-page article, CHI 2006, Apr. 22-27, 2006.

Weisz et al., "Watching Together: Integrating Text Chat with Video", Carnegie Mellon University/University of Minnesota, 10-page article, CHI 2007, Apr. 28-May 3, 2007.

Coppens et al., "AmigoTV: Towards a Social TV Experience", Alcatel Bell R&I Residential Networked Applications, 4-page article.

Nathan et al., "CollaboraTV: Making Television Viewing Social Again", pp. 85-94, axTV'08, Oct. 22-24, 2008.

Oehlberg et al., "Designing for Distributed, Sociable Television Viewing", Stanford University, Mechanical Engineering, Palo Alto Research Center, 10-page article.

\* cited by examiner

200

500

SYSTEM AND APPARATUS FOR MANAGING VIDEO CONTENT RECORDINGS

FIELD OF THE DISCLOSURE

The present disclosure relates generally to content management and more specifically to a system and apparatus for managing video content recordings.

BACKGROUND

Common media communication systems such as Internet Protocol Television (IPTV) systems, cable TV systems, satellite TV systems, or Internet content distribution systems can deliver audio content, video content, or combinations thereof to media devices such as a set-top box, media players (e.g., iPod™), media-capable phones (e.g., iPhone™), and so on. Some of the aforementioned content is distributed at scheduled times through broadcast channels, which can be recorded by a digital media recorder to accommodate a later presentation. The digital media recorder can be an integral part of the aforementioned computing devices, or coupled thereto for the purpose of recording media content.

DETAILED DESCRIPTION

One embodiment of the present disclosure entails a digital video recorder (DVR) having a controller to record video content supplied by a media communication system, establish a threshold for utilization of a memory resource of the DVR, detect a utilization of the memory resource that exceeds the threshold, generate a notice describing the utilization of the memory resource at or after the time the threshold was exceeded, identify a communication identifier associated with a portable communication device, transmit the notice to the portable communication device according to the identified communication identifier, and receive a response message from the portable communication device that includes one or more instructions to manage the memory resource of the DVR.

Another embodiment of the present disclosure entails a computer-readable storage medium operating in a DVR having computer instructions for recording video content supplied by a media communication system, detecting a utilization of a memory resource of the DVR that exceeds a threshold, transmitting a notice to at least one portable communication device, and receiving one or more instructions from the portable communication device to manage the memory resource of the DVR.

Yet another embodiment of the present disclosure entails a computer-readable storage medium operating in a communication device having computer instructions for receiving from a DVR a first message indicating that utilization of a memory resource of the DVR has exceeded a threshold, presenting the first message to a user of the communication device, receiving one or more instructions to manage the memory resource of the DVR, and transmitting to the DVR a second message with the one or more instructions.

Figure 1:
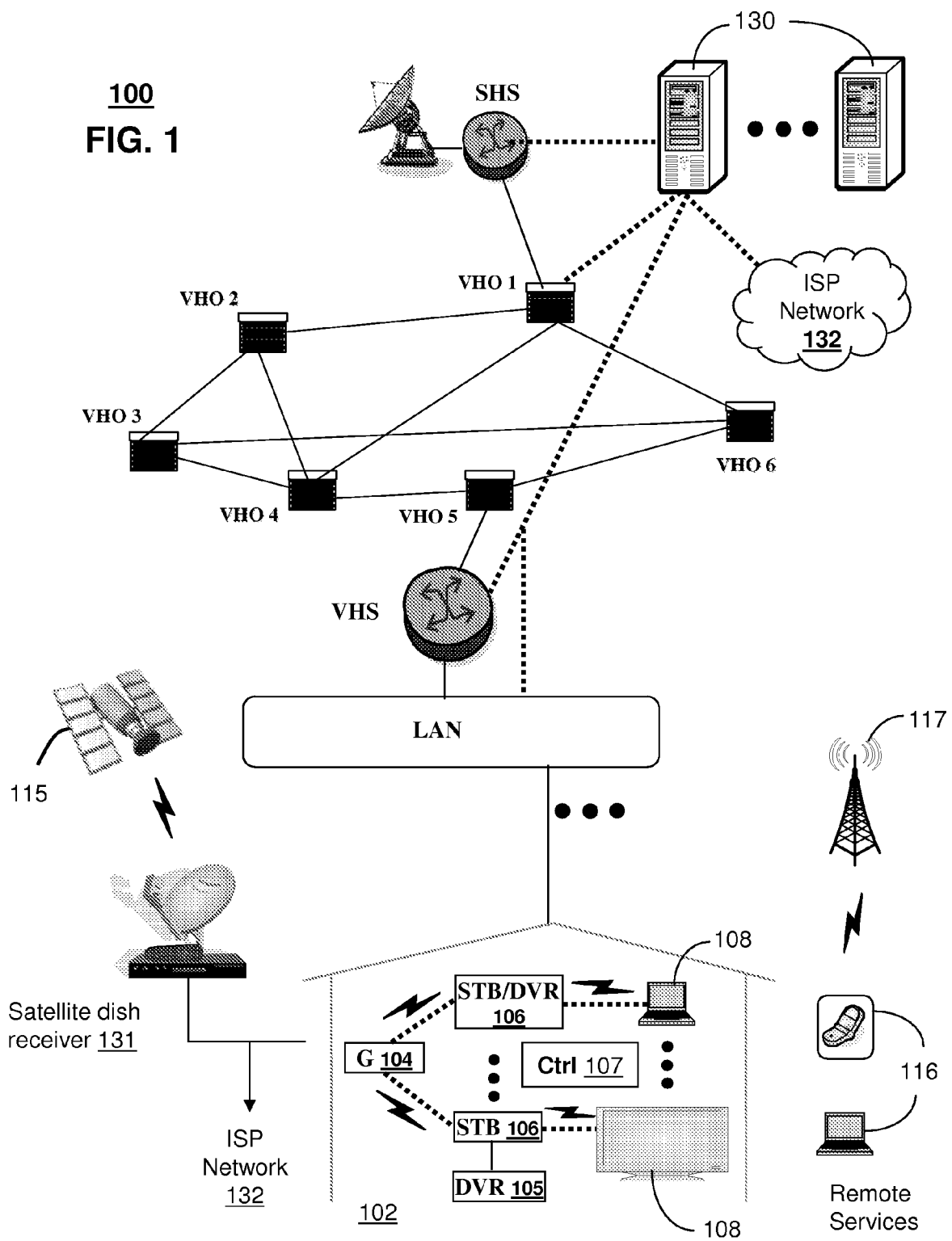
FIGS. 1-4 depict exemplary embodiments of communication systems that provide media services.

FIG. 1 depicts an exemplary embodiment of a first communication system 100 for delivering media content. The communication system 100 can represent an Internet Protocol Television (IPTV) broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control).

The STBs 106 can have built-in digital video recorders (DVRs) or can be coupled an independently operated DVR 105. Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). The computing devices 130 can also include a presence system (herein referred to as presence system 130). The presence system 130 can utilize common computing and communications technology to monitor subscriber communication devices operating in communication system 100 (e.g., cell phone, home phone, office phone, home computer, office computer, STB, and so on).

The presence system 130 can for example monitor communication activities taking place at the ISP network 132 to determine whether a subscriber of the communication system 100 is utilizing an office or home computer. The presence system 130 can also monitor whether the subscriber is utilizing a cellular phone by monitoring the subscriber's location. For instance, the presence system 130 can monitor that the cellular phone is transitioning between cellular base stations 117, which can indicate to the presence system that the subscriber is in transit (traveling in a car, or train). In another illustrative embodiment, or in combination, the presence system 130 can request location coordinates from a cellular phone incorporating a Global Positioning System (GPS) receiver, or utilize triangulation with three or more base stations 117 to hone in on an area where the cellular phone is operating. In another illustrative embodiment, the presence system 130 can monitor network elements of communication system 100 to detect that the subscriber has downloaded a VoD movie and is presently viewing the movie.

Generally speaking, the presence system 130 can be programmed to monitor the location and activities of a subscriber of the communication system by monitoring the use of any of the subscriber's available communication devices in communication system 100. Devices in the communication system 100 that request from the presence system 130 presence information of a subscriber of the communication system 100 can determine from this information a likely location of the subscriber and likely means to communicate with the subscriber.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
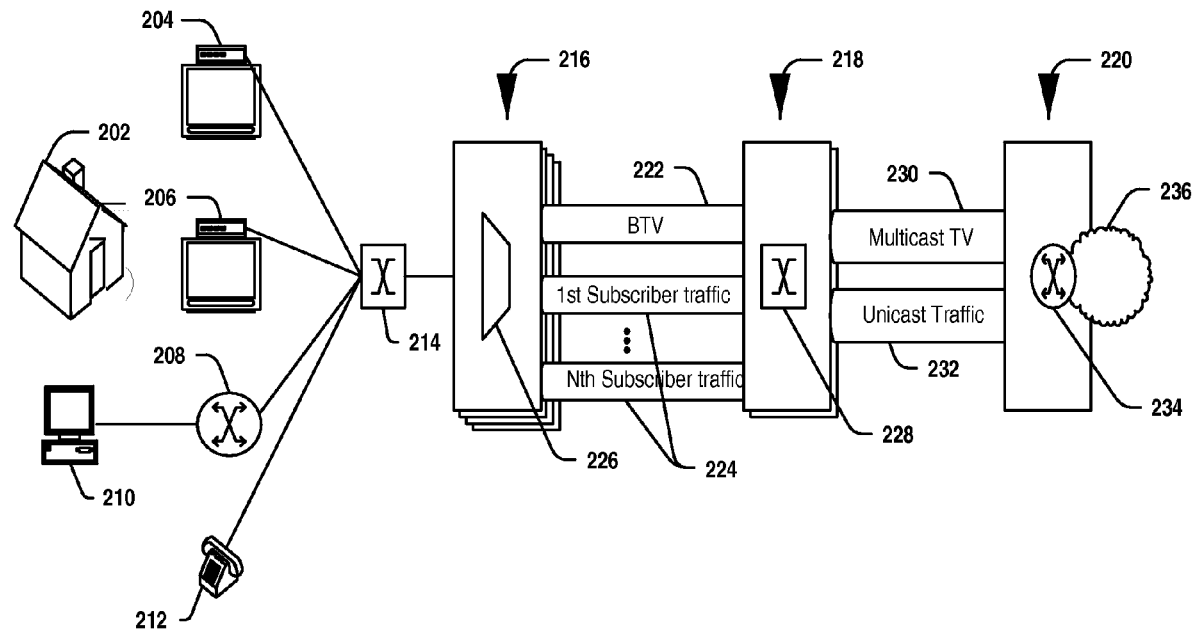

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220 that is in communication with a network 236. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The presence system 130 of FIG. 1 can be operably coupled to the second communication system 200 for purposes similar to those described earlier.

Figure 3:
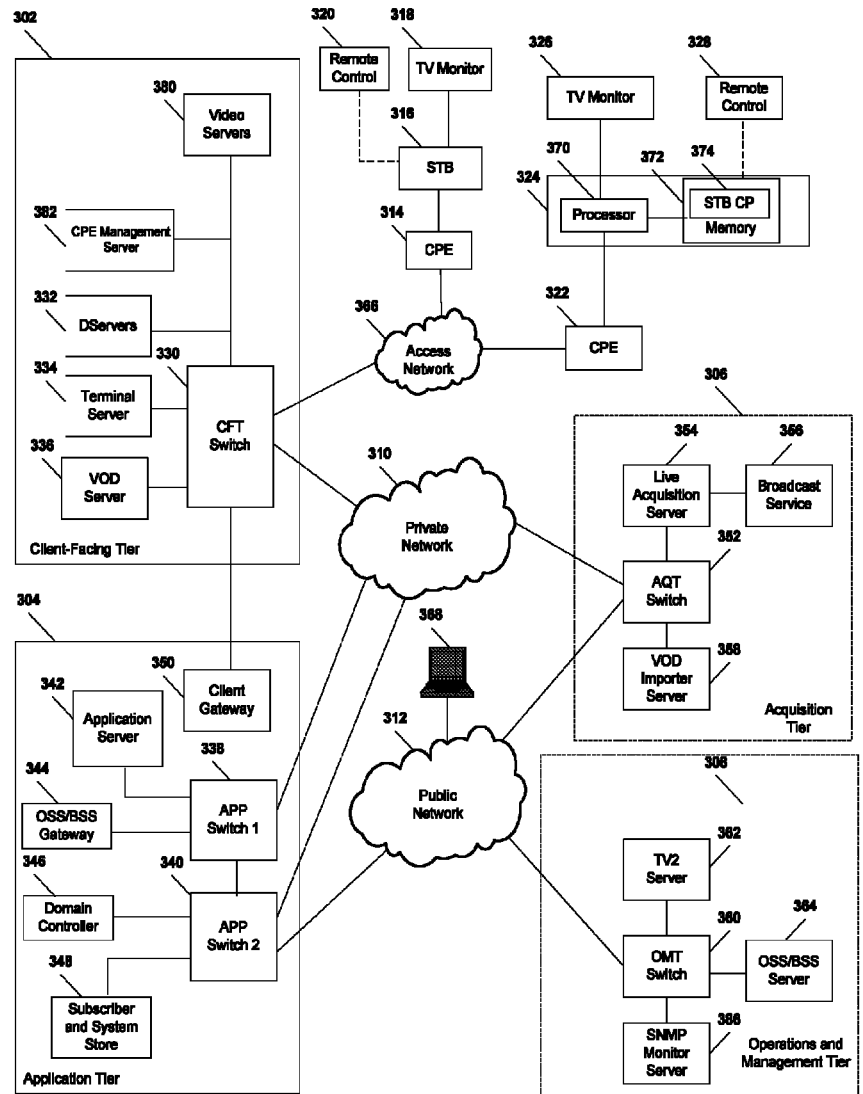

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The presence system 130 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
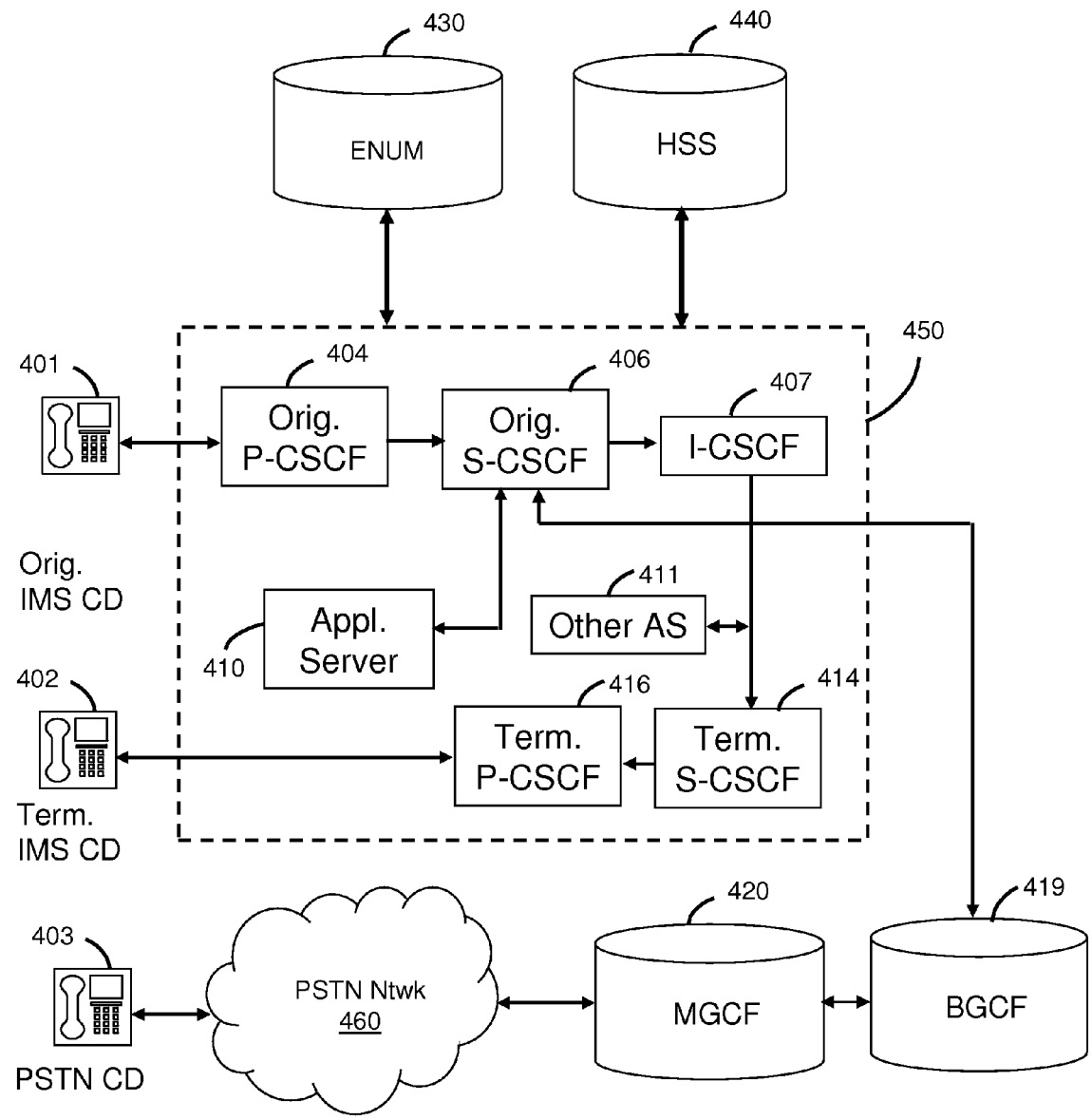

FIG. 4 depicts an exemplary embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the presence system 130 previously discussed for FIG. 1. In this representative embodiment, the presence system 130 can be accessed over a PSTN or VoIP channel of communication system 400 by common techniques such as described above.

Figure 5:
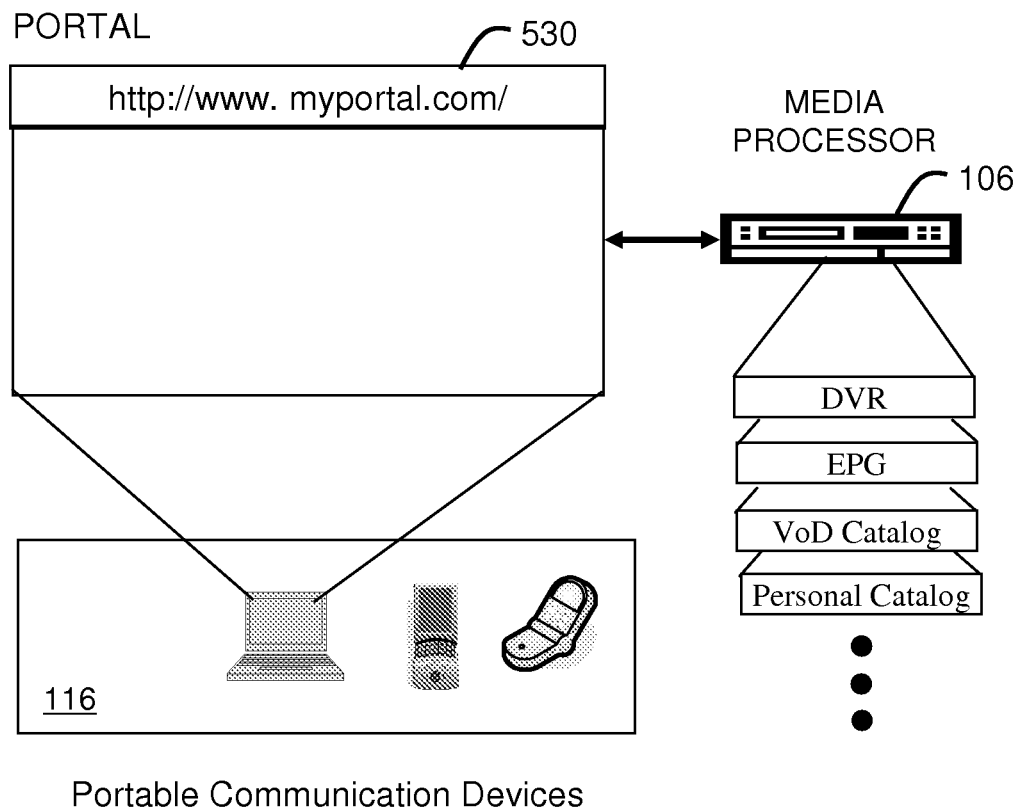
FIG. 5 depicts an exemplary embodiment of a portal interacting with at least one among the communication systems of FIGS. 1-4.

FIG. 5 depicts an exemplary embodiment 500 of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), and so on.

Figure 6:
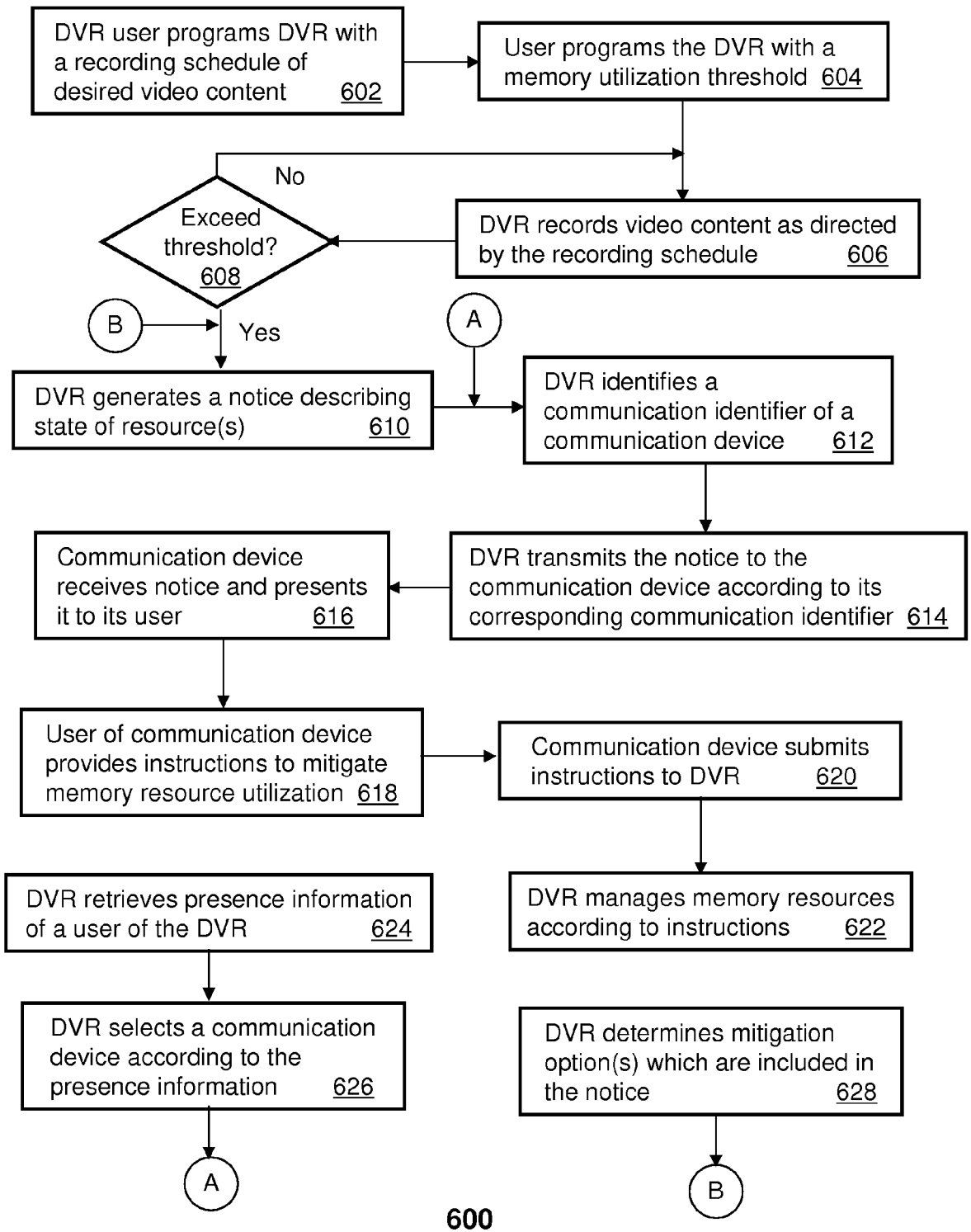
FIG. 6 depicts an exemplary method operating in portions of the communication systems of FIGS. 1-4.

FIG. 6 depicts an exemplary method 600 operating in portions of communication systems 100-400. Method 600 begins with step 602 in which a DVR which can be an integral component of an STB or an independently operated device coupled to the STB (see FIG. 1) is programmed by a user with a recording schedule of desired video content from any one of a number of media channels supplied by the media communications systems of FIGS. 1-4. In addition to the recording schedule, the user of the DVR can program the DVR in step 604 with a memory utilization threshold. Suppose for example that the DVR has a memory capacity of 200 hours of video recordings. The user can set a threshold of 198 hours. That is, the DVR can monitor when recordings have reached or exceeded this threshold. Alternatively, or in combination, the threshold can be defined in memory capacity terms (e.g., Megabytes or Gigabytes).

Once these settings have been established, the DVR proceeds to step 606 where it records video content as directed by the recording schedule established in step 602. In step 608, the DVR determines whether video content recordings have reached or exceeded the threshold set in step 604. If the threshold has not been reached, the DVR continues recording video content in step 606 according to the recording schedule. If the threshold is reached, the DVR proceeds to step 610 where it generates a notice that describes the state of one or more resources in the DVR. The state of resources can include for example how much memory capacity is available for recording video content (in hours of recording time, Megabytes, Gigabytes, etc.), a description of a portion of the recording schedule (such as a description of media programs that have recording times near the time when the threshold was exceeded), a description of which recordings will require mitigation of memory resources, and/or a description of media files that are stored in the DVR (e.g., a directory of media files with descriptive filenames such as program names, episodes, etc.).

In step 612, the DVR can be programmed to identify a communication identifier of a communication device. The communication identifier can represent an E.164 telephone number or SIP URI as described earlier. The communication device can represent a fixed-line telephone, mobile phone such as a cellular phone, or computing device such as a desktop or laptop computer. In step 614, the DVR can transmit the notice to the communication device, which in turn can present it to its user in step 616. The notice can be transmitted over a wireline medium, wireless medium, or combinations thereof. The notice can be transported in any format such as, for example, an email message, a short message service message (also commonly referred to as an SMS message), or a multimedia message service message (also commonly referred to as an MMS message), just to mention a few.

In step 616, the communication device can present the user with resources statistics of the DVR (e.g., memory utilization at 98%, 100 multimedia files stored, there is enough memory for a 1 hour recording, and so on). The communication device can also present a portion of the recording schedule where one or more conflicts may arise if room is not made available in the memory resource such as the hard drive and/or Flash memory of the DVR. Additionally, the communication device can be programmed to present a description of multimedia files stored in the DVR. All of this information can be retrieved by the communication device from the notice supplied by the DVR.

From this presentation, a user of the communication device can choose to mitigate the potential memory conflict by selecting multimedia files to delete, or transfer to another device such as the STB coupled to the DVR, a storage device located in the premises where the DVR is situated or in a remote location accessible by the DVR. Alternatively, or in combination, the user of the communication device can choose to modify the DVR recording schedule to mitigate the memory conflict.

The user can choose any of the above mitigation options by common means through a user interface of the communication device (e.g., display, keypad, and navigation functions) to generate in step 618 a number of instructions for the DVR which are transmitted to the DVR in step 620 over a wireline or wireless medium as described earlier. Upon receiving these instructions in step 622, the DVR can begin to manage its memory resources accordingly. For instance, the instructions may require transfer or deletion of media files to increase memory space. Additionally, or in the alternative, the instructions may require changing the recording schedule in a manner that reduces memory usage by, for example, removing one or more program recordings from the schedule.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted to apply steps 624-626. In step 624 the DVR can be programmed to retrieve presence information of the user of the DVR from the presence system 130. The presence information can indicate to the DVR which of a number of communication devices available to the user is being used by the user, or is accessible to the user at the time the threshold was exceeded. In some instances, the presence information may indicate more than communication device can be targeted to access the user (e.g., cell phone and/or computer terminal). In such circumstances, the DVD can be programmed in step 626 to select more than one communication device of the user to convey the notice. Once the selection is made, the DVR can be programmed to identify corresponding communication identifier(s) in step 612 of the selected communication device(s). The communication identifiers can be stored in the DVD, or retrieved by the DVD from a remote network element (e.g., a subscriber account management system) operating in any one of the media communication systems of FIGS. 1-4.

In step 628, the DVR can be programmed to determine one or more mitigation options which can be included in the notice generated in step 610. The DVR can, for example, collectively analyze the recording schedule, memory utilization, and the multimedia files in storage at the time the threshold was exceeded. From this analysis, the DVR can identify media files that have not been used for an extended period of time by the user of the DVR (e.g., more than a week), and identify the unused multimedia files as candidates for deletion or transfer to a back-up storage system. The DVR can also identify one or more media programs in the recording schedule which are periodically recorded, but are frequently not being viewed by the user. These mitigation options can be transmitted with the notice, which the user can accept, reject or ignore once presented at the communication device.

Broadly speaking, method 600 can be adapted to operate in a media recording device that records video and/or audio content distributed on one or more media channels (e.g., IPTV, satellite TV, cable TV, Internet radio programs, streaming music programs, etc.). Method 600 can be adapted so that the media recorder can be programmed with a media recording schedule (audio and/or video content), and a threshold for identifying an excess use of memory resources. When the threshold is exceeded, the media recorder can notify its user according to any of the embodiments previously described to prevent exhausting the media recorder's resources.

Other suitable modifications can be applied to the present disclosure without departing from the scope of the claims below. Accordingly, the reader is directed to the claims section for a fuller understanding of the breadth and scope of the present disclosure.

Figure 7:
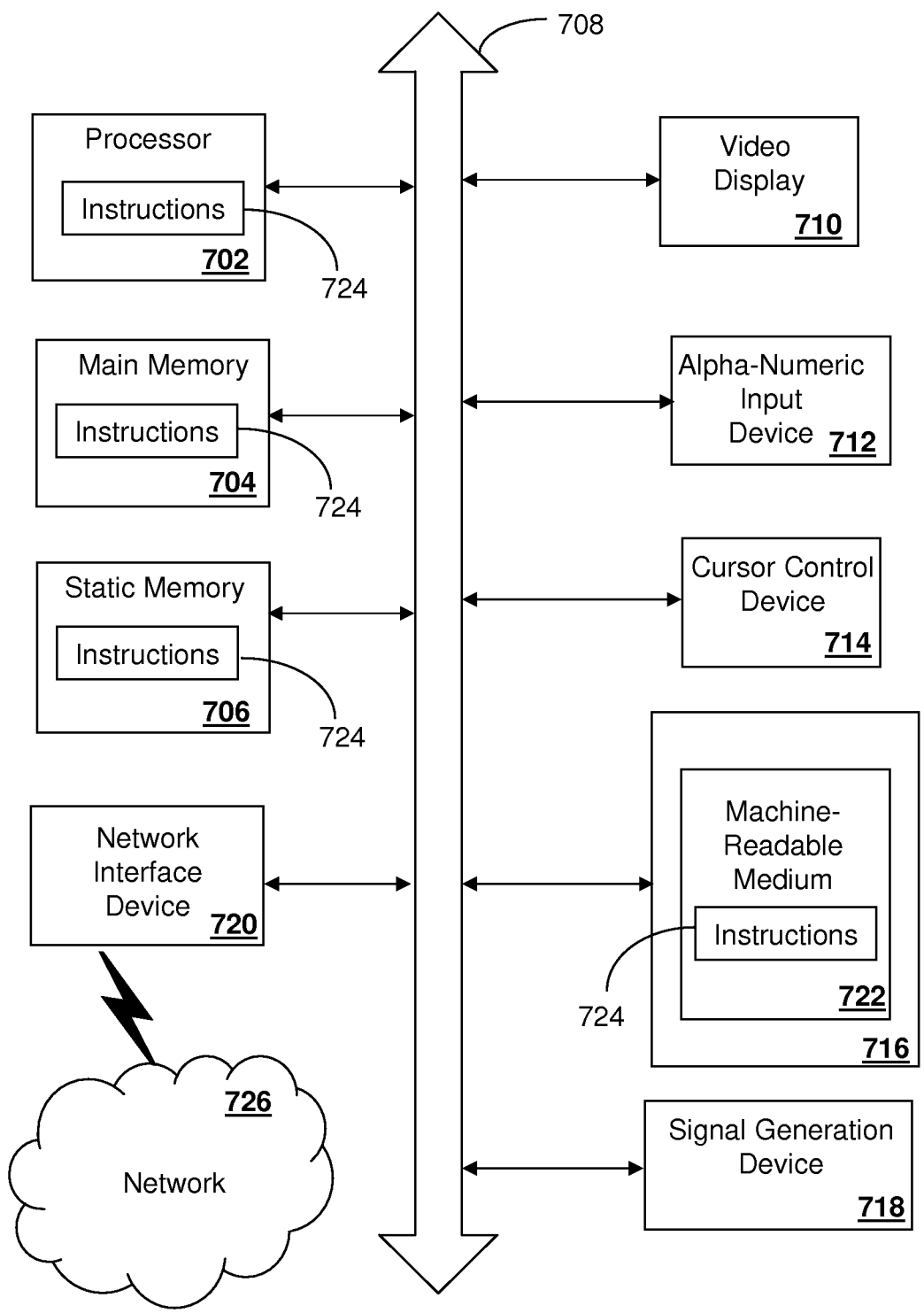
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A digital video recorder, comprising:
   a memory to store computer instructions; and
   a controller circuit coupled with the memory, wherein the controller circuit, responsive to executing the computer instructions, performs operations comprising:
   recording video content supplied by a media communication system;
   establishing a threshold for utilization of a memory resource of the digital video recorder, wherein the threshold is less than a capacity of the memory resource;

detecting a utilization of the memory resource that exceeds the threshold;

analyzing stored media files to identify candidate media files for removal from the memory resource based on a last time period that each of the stored media files was presented by the digital video recorder;

determining a mitigation option that includes removal of at least one of the identified candidate media files from the memory resource;

generating a notice describing the utilization of the memory resource responsive to the detecting of the utilization of the memory resource exceeding the threshold, wherein the notice includes the mitigation option;

identifying a communication identifier associated with a portable communication device;

transmitting the notice over a wireless network to the portable communication device according to the identified communication identifier, wherein the notice is not provided to any device with a wired connection to the digital video recorder; and receiving a response message from the portable communication device that includes instructions to manage the memory resource of the digital video recorder.

2. The digital video recorder of claim 1, wherein the media communication system comprises an internet protocol television communication system in communication with an internet protocol multimedia subsystem, wherein the mitigation option includes deleting a portion of the stored media files based on periodic recordings of a programming series that have not been presented, and wherein the threshold is established based on user input.

3. The digital video recorder of claim 1, wherein the controller circuit when executing the computer instructions performs operations comprising deleting a media file stored in the memory resource of the digital video recorder responsive to the instructions supplied in the response message and providing the deleted media file to a memory of a set top box that is coupled with the digital video recorder via a hardwire connection.

4. The digital video recorder of claim 1, wherein the controller circuit when executing the computer instructions performs operations comprising deleting and transferring to another device the at least one of the identified candidate media files stored in the memory resource of the digital video recorder responsive to the instructions supplied in the response message, wherein the other device comprises a set-top box coupled to the digital video recorder.

5. The digital video recorder of claim 1, wherein the mitigation option includes providing a video schedule recording for the digital video recorder for remote modification, and wherein the controller circuit when executing the computer instructions performs operations comprising modifying a video recording schedule of the digital video recorder responsive to the instructions supplied in the response message.

6. The digital video recorder of claim 1, wherein the message transmitted to the portable communication device corresponds to a short message service message.

7. The digital video recorder of claim 1, wherein the notice includes a summary of the at least one of the identified candidate media files, and wherein the mitigation option is to transfer the at least one of the identified candidate media files to a remote storage device that is in communication with the digital video recorder.

8. The digital video recorder of claim 1, wherein the portable communication device corresponds to a voice-over internet protocol communication device, and wherein the communication identifier comprises one of an E.164 number or a session initiation protocol uniform resource identifier.

9. The digital video recorder of claim 1, wherein the notice comprises memory resource statistics, an identification of scheduled recording of media content that will not be performed due to the utilization of the memory resource exceeding the threshold, and identification of candidate scheduled recordings for removal from a video recording schedule, wherein the candidate scheduled recordings are identified by the controller circuit based on being periodically recorded content and based on a frequency of presentation of the periodically recorded content.

10. The digital video recorder of claim 9, wherein the mitigation option is determined based on the utilization of the memory resource, a schedule of video content recordings directing operations of the digital video recorder, and recording preferences of a user of the digital video recorder.

11. The digital video recorder of claim 9, wherein the controller circuit when executing the computer instructions performs operations comprising executing the mitigation option responsive to the instructions supplied in the response message.

12. The digital video recorder of claim 1, wherein the controller circuit when executing the computer instructions performs operations comprising retrieving the communication identifier from a set-top box coupled to the digital video recorder.

13. The digital video recorder of claim 1, wherein the controller circuit when executing the computer instructions performs operations comprising:

retrieving presence information associated with a user; and selecting according to the presence information the portable communication device from a plurality of communication devices available to the user.

14. A non-transitory computer-readable storage medium operating in a digital video recorder, comprising computer instructions which when executed by a processor cause the processor to perform operations comprising:

recording video content supplied by a media communication system;

detecting a utilization of a memory resource of the digital video recorder that exceeds a threshold wherein the threshold is less than a capacity of the memory resource;

identifying candidate scheduled recordings for removal from a video recording schedule of the digital video recorder, wherein the candidate scheduled recordings are identified based on being periodically recorded content and based on a frequency of presentation of the periodically recorded content;

determining mitigation options that includes removal of at least one of the identified candidate scheduled recordings from the video recording schedule;

generating a notice describing the utilization of the memory resource responsive to the detecting of the utilization of the memory resource exceeding the threshold, wherein the notice includes the mitigation options;

obtaining presence information for a plurality of communication devices associated with the digital video recorder;

selecting a group of device from among the plurality of communication devices based on the presence information;

transmitting the notice over a wireless network to the group of devices, wherein the notice is not provided to any device with a wired connection to the digital video recorder; and receiving instructions from one of the group of devices to manage the memory resource of the digital video recorder in response to the transmitted notice.

15. The non-transitory computer-readable storage medium of claim 14, comprising computer instructions which when executed by the processor cause the processor to perform operations comprising:
   identifying communication identifiers that corresponds to the group of devices; and
   transmitting the notice to the group of devices according to the corresponding communication identifiers.

16. The non-transitory computer-readable storage medium of claim 15, wherein the communication identifiers comprise a telephone number, wherein the threshold is established based on user input at the digital video recorder.

17. The non-transitory computer-readable storage medium of claim 14, wherein the media communication system comprises an internet protocol television communication system in communication with an internet protocol multimedia subsystem.

18. The non-transitory computer-readable storage medium of claim 14, comprising computer instructions which when executed by the processor cause the processor to perform operations comprising receiving a response SMS message from the one of the group of devices which includes the instructions to manage the memory resource of the digital video recorder.

19. The non-transitory computer-readable storage medium of claim 18, comprising computer instructions which when executed by the processor cause the processor to perform operations comprising performing at least one of deleting or transferring a media file stored in the memory resource of the digital video recorder, or modifying the video recording schedule of the digital video recorder responsive to the instructions supplied in the response message.

20. The non-transitory computer-readable storage medium of claim 14, comprising computer instructions which when executed by the processor cause the processor to perform operations comprising:
   analyzing stored media files to identify candidate media files for removal from the memory resource based on a last time period that each of the stored media files was presented;
   providing the identified candidate media files for removal with the mitigation options; and
   carrying out one of the mitigation options responsive to receiving the instructions from the one of the group of devices.

* * * * *